(12) United States Patent
Hasegawa et al.

(10) Patent No.: US 11,398,151 B2
(45) Date of Patent: Jul. 26, 2022

(54) SERVER, SERVER CONTROL METHOD, SERVER CONTROL PROGRAM, VEHICLE, VEHICLE CONTROL METHOD, AND VEHICLE CONTROL PROGRAM

(71) Applicant: TOYOTA JIDOSHA KABUSHIKI KAISHA, Toyota (JP)

(72) Inventors: Hideo Hasegawa, Nagoya (JP); Keiko Kameda, Toyota (JP); Misa Ejiri, Nagoya (JP); Shintaro Naruse, Nisshin (JP); Tadahiro Kashiwai, Nagoya (JP); Naoya Oka, Toyota (JP); Kensuke Koike, Nisshin (JP); Hiroyuki Monji, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 123 days.

(21) Appl. No.: 16/695,301

(22) Filed: Nov. 26, 2019

(65) Prior Publication Data

US 2020/0234577 A1 Jul. 23, 2020

(30) Foreign Application Priority Data

Jan. 18, 2019 (JP) .............................. JP2019-007166

(51) Int. Cl.
*G08G 1/04* (2006.01)
*G08G 1/00* (2006.01)
(Continued)

(52) U.S. Cl.
CPC .............. *G08G 1/04* (2013.01); *G06V 20/584* (2022.01); *G08G 1/202* (2013.01); *G08G 1/205* (2013.01); *H04W 4/40* (2018.02)

(58) Field of Classification Search
CPC .......... G08G 1/04; G08G 1/202; G08G 1/205; G08G 1/0965; H04W 4/40; G06K 9/00825; G07C 5/008
See application file for complete search history.

(56) References Cited

U.S. PATENT DOCUMENTS 8,159,535 B2 * 4/2012 Kitani ...................... H04N 7/18
348/148
8,483,651 B1 * 7/2013 Zamora ................... H04W 4/12
455/404.1
(Continued)

FOREIGN PATENT DOCUMENTS

CN 108428333 A 8/2018
JP 2000-285374 A 10/2000
(Continued)

*Primary Examiner* — Hoi C Lau
(74) *Attorney, Agent, or Firm* — Oblon, McClelland, Maier & Neustadt, L.L.P.

(57) ABSTRACT

A server includes a server communication unit, a server control unit, and a server storage unit, and is connected in a communicable manner to a first vehicle and a second vehicle via the server communication unit. The server control unit transmits an imaging start command to the second vehicle, which runs within a predetermined range from an accident site, in response to the reception of an accident notification associated with positional information on the accident site from the first vehicle, receives an imaged image from the second vehicle, and stores the imaged image into the server storage unit.

5 Claims, 9 Drawing Sheets

(51) Int. Cl.
*H04W 4/40* (2018.01)
*G06V 20/58* (2022.01)

(56) References Cited

U.S. PATENT DOCUMENTS

| | | | |
|---|---|---|---|
| 10,832,699 B1* | 11/2020 | McFarland, Jr. | B60R 25/102 |
| 11,107,355 B2* | 8/2021 | McFarland, Jr. | G06K 9/00791 |
| 2003/0067392 A1* | 4/2003 | Monroe | G08B 21/0269 |
| | | | 340/573.1 |
| 2007/0285512 A1* | 12/2007 | Kitani | H04N 7/18 |
| | | | 348/148 |
| 2010/0219944 A1* | 9/2010 | Mc Cormick | G07C 5/008 |
| | | | 340/436 |
| 2011/0018736 A1* | 1/2011 | Carr | G08G 1/0965 |
| | | | 340/902 |
| 2013/0086109 A1* | 4/2013 | Huang | G06F 16/244 |
| | | | 707/770 |
| 2014/0104408 A1* | 4/2014 | Nanba | H04N 7/188 |
| | | | 348/119 |
| 2014/0300739 A1* | 10/2014 | Mimar | G08B 21/06 |
| | | | 348/148 |
| 2015/0334721 A1* | 11/2015 | Kim | H04W 72/02 |
| | | | 370/330 |
| 2017/0213462 A1* | 7/2017 | Prokhorov | G08G 1/0965 |
| 2017/0214760 A1* | 7/2017 | Lee | H04W 4/80 |
| 2017/0300503 A1* | 10/2017 | Wang | G06F 16/7867 |
| 2018/0095457 A1* | 4/2018 | Lee | G08G 1/09623 |
| 2018/0341016 A1* | 11/2018 | Ohmoto | G01S 7/4026 |
| 2019/0193659 A1* | 6/2019 | Miyazawa | G08B 25/00 |
| 2019/0339709 A1* | 11/2019 | Tay | G05D 1/0088 |
| 2020/0175474 A1* | 6/2020 | Hamagami | B60W 40/09 |
| 2020/0234577 A1* | 7/2020 | Hasegawa | H04W 4/02 |
| 2020/0401128 A1* | 12/2020 | Ha | B60R 11/00 |

FOREIGN PATENT DOCUMENTS

| | | |
|---|---|---|
| JP | 2001-43469 A | 2/2001 |
| JP | 2006-5550 A | 1/2006 |
| JP | 2008-225777 A | 9/2008 |
| JP | 2013-157787 A | 8/2013 |
| JP | 2017-117005 A | 6/2017 |
| WO | WO 2018/008122 A1 | 1/2018 |

* cited by examiner

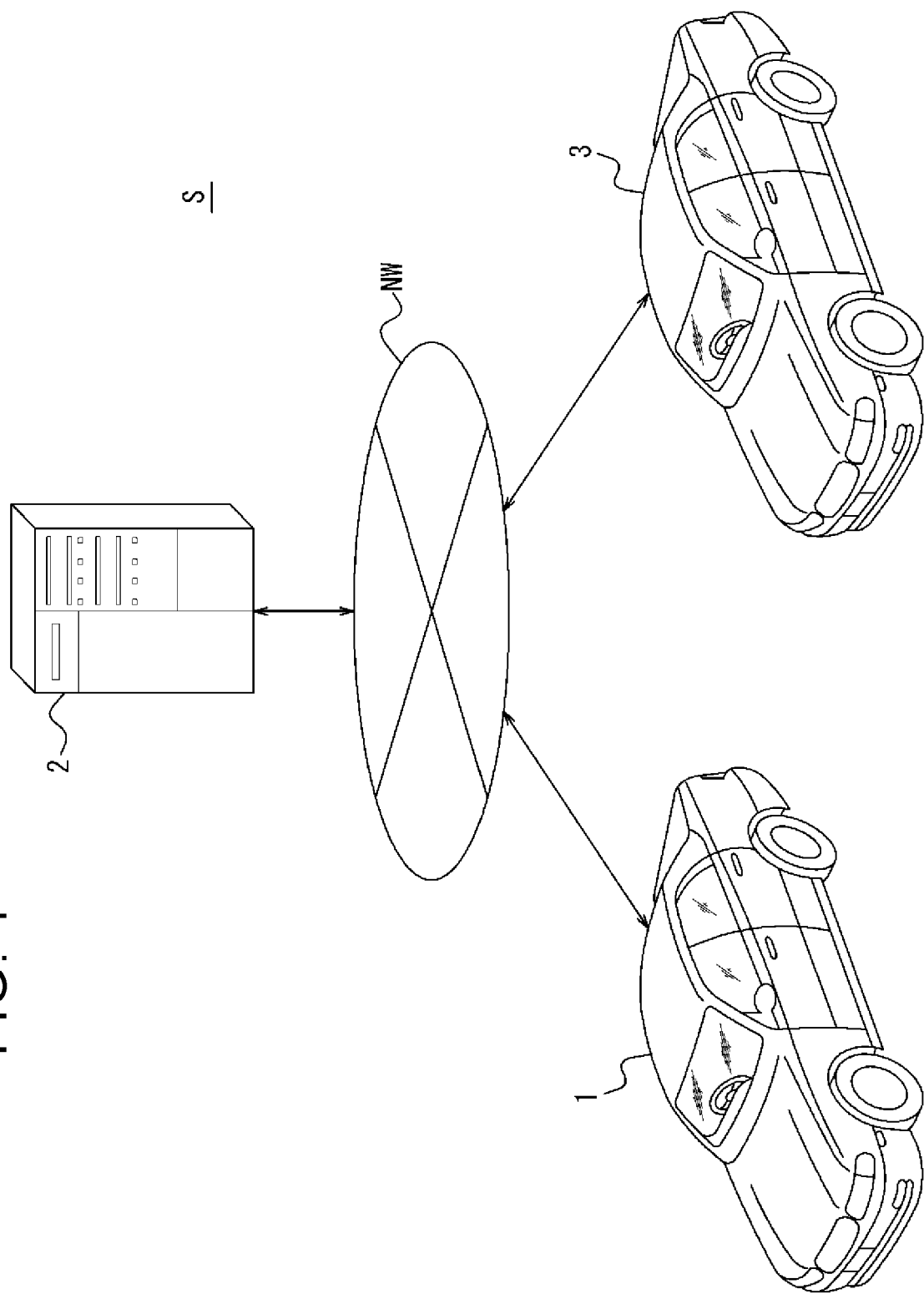

FIG. 4

| ACCIDENT ID | POSITION |
|---|---|
| A001 | (X1,Y1) |
| A002 | (X2,Y2) |
| ... | ... |

FIG. 5

| ACCIDENT ID | VEHICLE ID | POSITION | WITHIN PREDETERMINED RANGE? |
|---|---|---|---|
| A001 | V001 | (P1,Q1) | Y |
| A001 | V002 | (P2,Q2) | Y |
| A001 | V003 | (P3,Q3) | N |

SERVER, SERVER CONTROL METHOD, SERVER CONTROL PROGRAM, VEHICLE, VEHICLE CONTROL METHOD, AND VEHICLE CONTROL PROGRAM

INCORPORATION BY REFERENCE

The disclosure of Japanese Patent Application No. 2019-007166 filed on Jan. 18, 2019 including the specification, drawings and abstract is incorporated herein by reference in its entirety.

BACKGROUND

1. Technical Field

The disclosure relates to a server, a server control method, a server control program, a vehicle, a vehicle control method, and a vehicle control program.

2. Description of Related Art

Conventionally, there is known an emergency notification system that transmits, to a control center, an image photographed by a vehicle involved in an accident and representing a periphery of the vehicle (e.g., Japanese Patent Application Publication No. 2008-225777 (JP 2008-225777 A)).

SUMMARY

The image received by the control center is photographed by the vehicle itself involved in the accident, and hence provides a limited viewpoint. In consequence, the control center may not be able to grasp the accurate situation of the accident.

It is an object of the disclosure, which has been made in view of the above-mentioned problem, to provide a server, a server control method, a server control program, a vehicle, a vehicle control method, and a vehicle control program that make it possible to more accurately grasp the situation of an accident.

A server according to one embodiment of the disclosure is a server that includes a server communication unit, a server control unit, and a server storage unit. The server is configured to be able to communicate with a first vehicle and a second vehicle via the server communication unit. The server control unit transmits an imaging start command to the second vehicle, which runs within a predetermined range from an accident site, in response to reception of an accident notification associated with positional information on the accident site from the first vehicle, receives an imaged image from the second vehicle, and stores the imaged image into the server storage unit.

A server control method according to one embodiment of the disclosure is a server control method for a server that includes a server communication unit, a server control unit, and a server storage unit. The server is connected in a communicable manner to a first vehicle and a second vehicle via the server communication unit. The method includes a step of transmitting an imaging start command to the second vehicle, which runs within a predetermined range from an accident site, in response to reception of an accident notification associated with positional information on the accident site from the first vehicle, and a step of receiving an imaged image from the second vehicle and storing the imaged image into the server storage unit.

A server control program according to one embodiment of the disclosure causes a server that includes a server communication unit, a server control unit, and a server storage unit and that is connected in a communicable manner to a first vehicle and a second vehicle via the server communication unit to carry out a step of transmitting an imaging start command to the second vehicle, which runs within a predetermined range from an accident site, in response to reception of an accident notification associated with positional information on the accident site from the first vehicle, and a step of receiving an imaged image from the second vehicle and storing the imaged image into the server storage unit.

A vehicle according to one embodiment of the disclosure is a vehicle that is equipped with a communication unit, a storage unit, a control unit, and an imaging unit. The vehicle is configured to be able to communicate with a server or another vehicle via the communication unit. The control unit determines a position of the own vehicle in response to reception of an accident notification associated with positional information on an accident site from the server or the another vehicle, starts imaging through use of the imaging unit when it is determined that the own vehicle runs within a predetermined range from the accident site, stores an imaged image into the storage unit, and transmits the imaged image via the communication unit.

A vehicle control method according to one embodiment of the disclosure is a vehicle control method for a vehicle that is equipped with a communication unit, a storage unit, a control unit, and an imaging unit. The vehicle is configured to be able to communicate with a server or another vehicle via the communication unit. The method includes a step of determining a position of the own vehicle in response to reception of an accident notification associated with positional information on an accident site from the server or the another vehicle, a step of starting imaging through use of the imaging unit when it is determined that the own vehicle runs within a predetermined range from the accident site, and a step of storing an imaged image into the storage unit and transmitting the imaged image via the communication unit.

A vehicle control program according to one embodiment of the disclosure causes a vehicle that is equipped with a communication unit, a storage unit, a control unit, and an imaging unit and that is configured to be able to communicate with a server or another vehicle via the communication unit to carry out a step of determining a position of the own vehicle in response to reception of an accident notification associated with positional information on an accident site from the server or the another vehicle, a step of starting imaging through use of the imaging unit when it is determined that the own vehicle runs within a predetermined range from the accident site, and a step of storing an imaged image into the storage unit and transmitting the imaged image via the communication unit.

The server, the server control method, the server control program, the vehicle, the vehicle control method, and the vehicle control program according to the disclosure make it possible to more accurately grasp the situation of the accident.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is an overall view of an information processing system of one of the embodiments;

FIG. 4 is a view showing a first example of data that are stored into a storage unit of the present embodiment;

FIG. 5 is a view showing a second example of data that are stored into the storage unit of the present embodiment;

DETAILED DESCRIPTION OF EMBODIMENTS

Figure 2A:
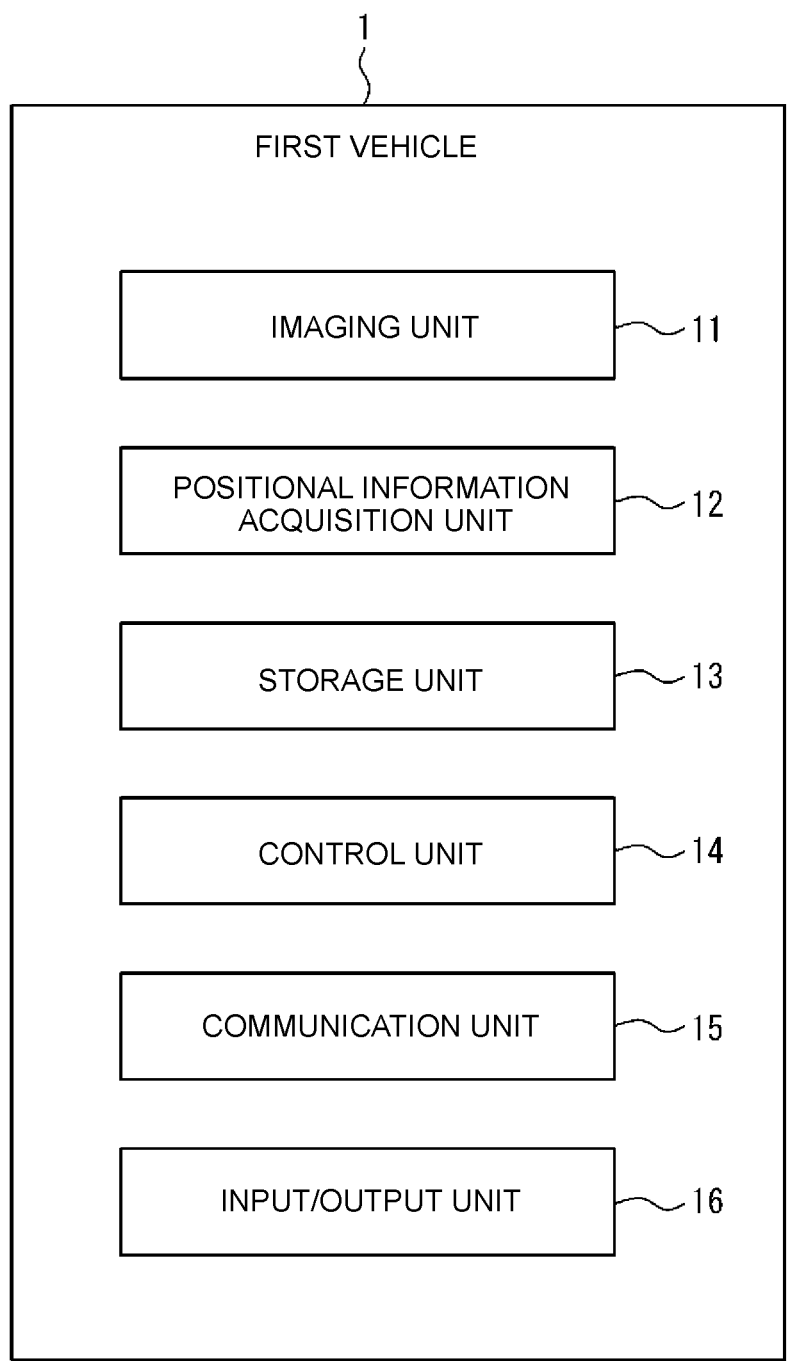
FIG. 2A is a functional block diagram of a first vehicle of the present embodiment.

The embodiments of the disclosure will be described hereinafter through the use of the drawings.

FIG. 1 is an overall view of an information processing system S of one of the embodiments. The information processing system S includes a first vehicle 1, a server 2, and a second vehicle 3. The first vehicle 1 and the second vehicle 3 of the present embodiment are, for example, motor vehicles, but should not be limited thereto. The first vehicle 1 and the second vehicle 3 may be any types of vehicles. For the sake of simplified explanation, the single first vehicle 1, the single server 2, and the single second vehicle 3 are shown in FIG. 1. However, the number of first vehicles 1, the number of servers 2, and the number of second vehicles 3 may each be equal to or larger than one. The first vehicle 1, the server 2, and the second vehicle 3 are configured to be able to communicate with one another via a network NW including, for example, a mobile communication network, the Internet or the like.

First of all, the outline of a process that is performed by the information processing system S of the present embodiment will be described. When it is determined that the first vehicle 1 has got involved in an accident while running (e.g., when it is determined that the first vehicle 1 has got involved in a rear-end accident), the first vehicle 1 transmits an accident notification to the server 2. The server 2 that has received the accident notification transmits an imaging start command to the second vehicle 3, which runs within a predetermined range from an accident site. The second vehicle 3 that has received the imaging start command images an image, and transmits the imaged image to the server 2.

As described hitherto, according to the present embodiment, the server 2 can collect the image of the first vehicle 1 at the accident site from the second vehicle 3, which runs around the accident site. In consequence, the server 2 can grasp in an overviewing manner the situation of the accident from therearound, and hence can more accurately grasp the situation of the accident. For example, the server 2 can determine, through the use of image analysis as will be described later, how many emergency motor vehicles are needed, and notify the police, the fire department or the like thereof. Therefore, the damage can be restrained from spreading.

The internal configurations of the first vehicle 1, the server 2, and the second vehicle 3 will be described in detail.

As shown in FIG. 2A, the first vehicle 1 is equipped with an imaging unit 11, a positional information acquisition unit 12, a storage unit 13, a control unit 14, a communication unit 15, and an input/output unit 16.

The imaging unit 11 includes a so-called in-vehicle camera, and images an image of an outside of the first vehicle 1 (e.g., a region in front of, beside, behind the first vehicle 1 etc.). The imaging unit 11 may generate a continuous image of the outside of the first vehicle 1 while the first vehicle 1 runs and is stopped, and record the generated image into the storage unit 13. As an alternative example, an arbitrary communication terminal such as a smartphone or the like may function as the imaging unit 11.

The positional information acquisition unit 12 includes at least one receiver corresponding to an arbitrary satellite positioning system. For example, the positional information acquisition unit 12 may include a global positioning system (GPS) receiver. The positional information acquisition unit 12 detects positional information indicating a position where the first vehicle 1 is stopped or runs. The positional information acquisition unit 12 may further include an electronic compass, and may acquire information on a direction in which the first vehicle 1 is oriented.

The storage unit 13 is a device that records or stores various pieces of information, and includes at least one memory. "The memory" is, for example, a semiconductor memory, a magnetic memory, an optical memory, or the like, but should not be limited thereto. Each memory that is included in the storage unit 13 may function as, for example, a main storage device, an auxiliary storage device, or a cash memory. The storage unit 13 may store information on a result analyzed or processed by the control unit 14. The storage unit 13 may store a vehicle control program of the own vehicle, various pieces of information on the operation or control of the first vehicle 1, and the like.

The control unit 14 is equipped with at least one processor. "The processor" may be a general-purpose processor or a dedicated processor designed for a specific process. For example, an electronic control unit (ECU) mounted in the first vehicle 1 may function as the control unit 14. The control unit 14 controls the operation of the first vehicle 1 as a whole. The control unit 14 controls the other functional units that are included in the first vehicle 1, and performs all types of control regarding the running or operation of the first vehicle 1. For example, the control unit 14 can acquire an image from the imaging unit 11, and analyze the image.

The communication unit 15 includes a communication module that establishes communication between the first vehicle 1 and the server 2. The communication unit 15 may include, as necessary, a communication module that establishes vehicle-to-vehicle communication between the first vehicle 1 and another vehicle without the intermediary of the server 2. The communication unit 15 may include a communication module that is connected to the network NW, or a communication module corresponding to a mobile communication standard such as 4th Generation (4G), 5th Generation (5G), or the like. For example, a data communication module (DCM) or the like mounted in the first vehicle 1 may function as the communication unit 15.

The input/output unit 16 includes an input interface that detects a user input and that sends input information to the control unit 14. The input interface is, for example, a physical key, a capacitance key, a touch screen provided integrally with a panel display, a microphone that receives a speech input, or the like, but should not be limited thereto. The input interface may be an arbitrary input unit. The input/output unit 16 includes an output interface that outputs, to a user, information generated by the control unit 14 or information read out from the storage unit 13. The output interface is, for example, a panel display or a head-up display that outputs information as an image, a speaker that outputs information as a speech, or the like, but should not be limited thereto. The output interface may be an arbitrary output unit.

Figure 2B:
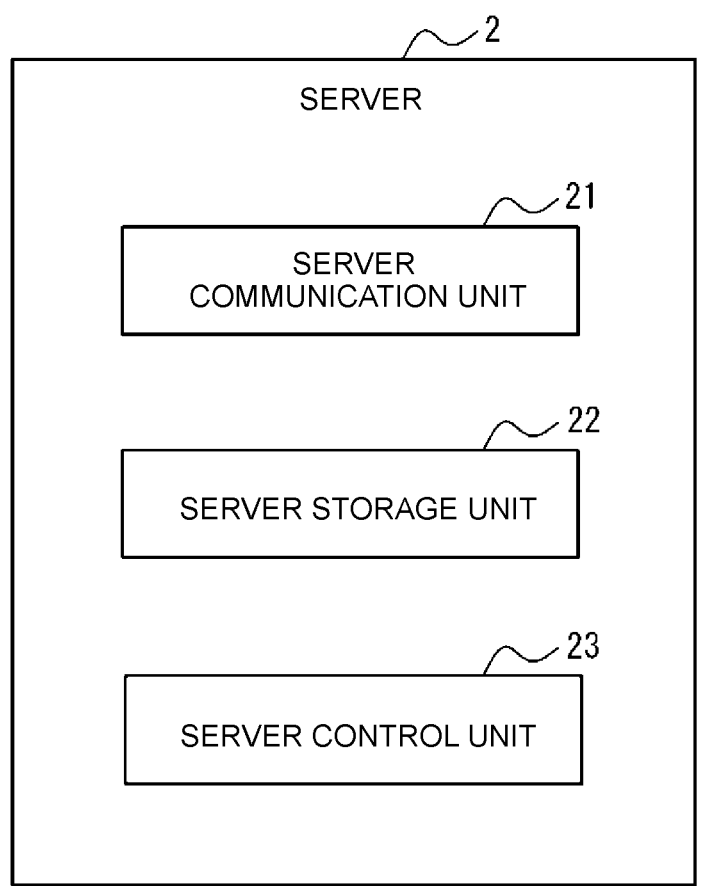
FIG. 2B is a functional block diagram of a server of the present embodiment.

As shown in FIG. 2B, the server 2 is equipped with a server communication unit 21, a server storage unit 22, and a server control unit 23.

The server communication unit 21 includes a communication module that establishes communication between the server 2 and the first vehicle 1 and between the server 2 and the second vehicle 3. The server communication unit 21 may include a communication module that is connected to the network NW. The server communication unit 21 can acquire information output from the first vehicle 1 or the second vehicle 3, and transmit the information to another arbitrary terminal connected via the network NW.

The server storage unit 22 is a device that records or stores various pieces of information, and includes at least one memory. Each memory that is included in the server storage unit 22 may function as, for example, a main storage device, an auxiliary storage device, or a cash memory. The server storage unit 22 stores, for example, information output from the first vehicle 1 or the second vehicle 3. The server storage unit 22 may store a server control program, or various programs regarding the operation or control of the information processing system S as a whole.

The server control unit 23 is equipped with at least one processor. The server control unit 23 controls the server communication unit 21 and the server storage unit 22, and performs all types of control regarding the operation of the server 2 as a whole.

Figure 2C:
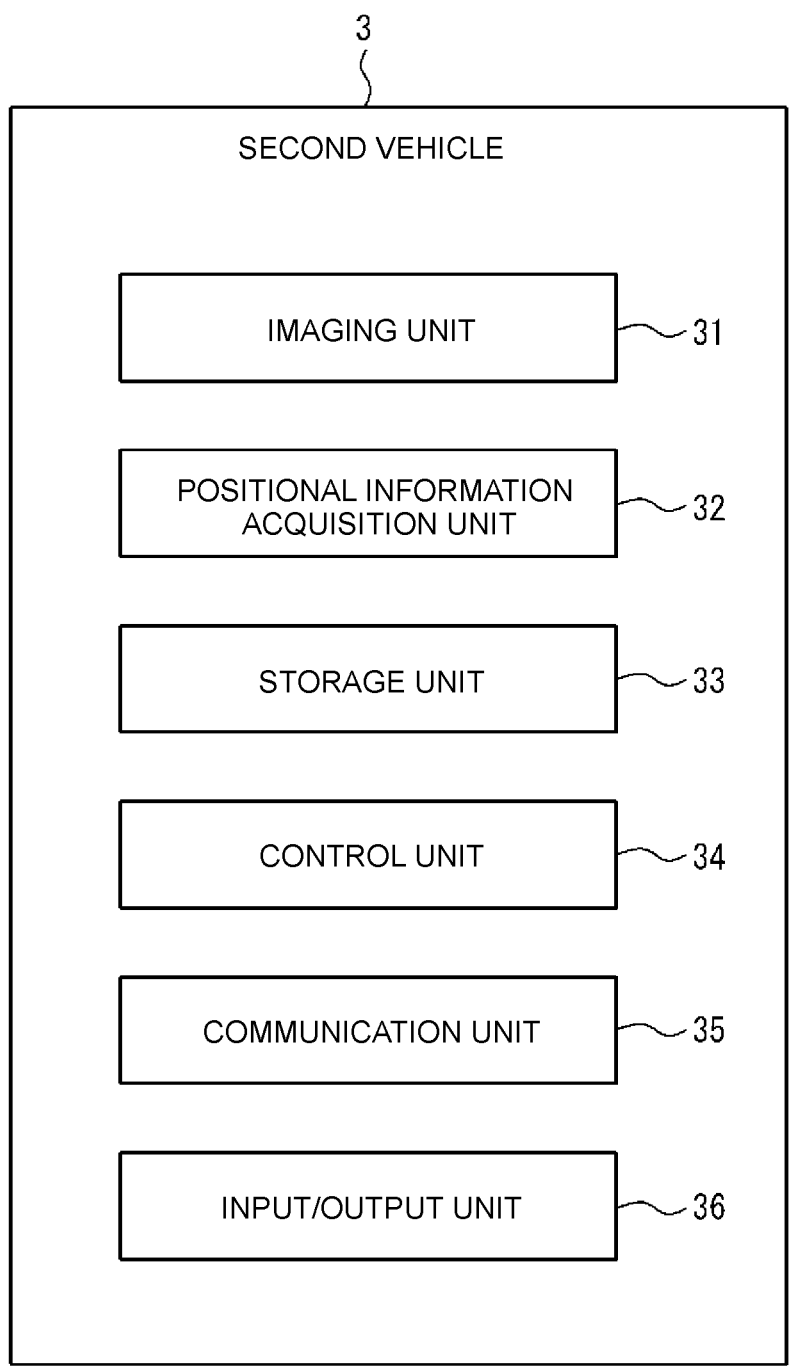
FIG. 2C is a functional block diagram of a second vehicle of the present embodiment.

As shown in FIG. 2C, the second vehicle 3 is equipped with an imaging unit 31, a positional information acquisition unit 32, a storage unit 33, a control unit 34, a communication unit 35, and an input/output unit 36. The hardware configurations of the imaging unit 31, the positional information acquisition unit 32, the storage unit 33, the control unit 34, the communication unit 35, and the input/output unit 36 are identical to the hardware configurations of the imaging unit 11, the positional information acquisition unit 12, the storage unit 13, the control unit 14, the communication unit 15, and the input/output unit 16 respectively. In consequence, the description of those units is omitted herein.

Figure 3:
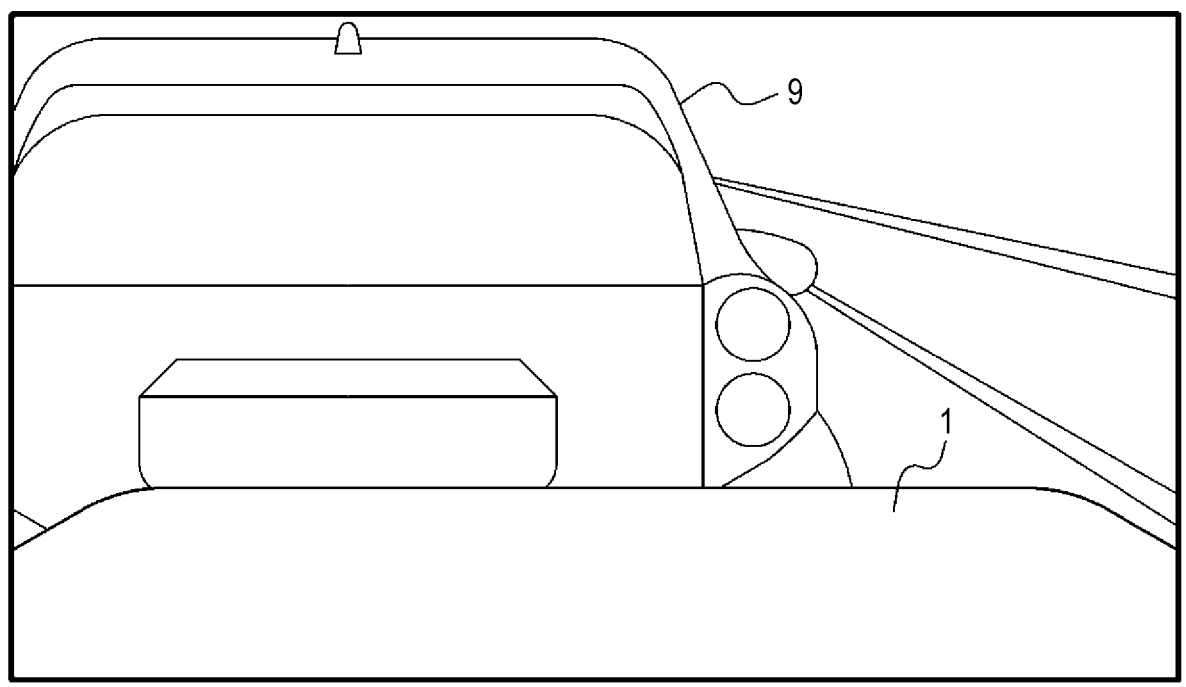
FIG. 3 is an exemplary image imaged by the first vehicle.

A control method that is carried out by the information processing system S will be described hereinafter in detail. While running or being stopped, the first vehicle 1 determines, according to an arbitrary method, whether or not the first vehicle 1 has got involved in an accident. In concrete terms, the first vehicle 1 determines that the first vehicle 1 has got involved in an accident, for example, in response to detection of a predetermined impact in an airbag ECU, or in response to detection of the blurring of a video imaged by the imaging unit 11 or a predetermined sound (e.g., a collision sound, an overturning sound, or the like). In the present embodiment, as an example, a case where the first vehicle 1 has determined, from an image imaged by the imaging unit 11 (see FIG. 3), that the first vehicle 1 has got involved in a rear-end accident with a preceding vehicle 9 will be described.

When it is determined that the first vehicle 1 has got involved in an accident, the first vehicle 1 acquires positional information on the first vehicle 1 via the positional information acquisition unit 12. The positional information corresponds to positional information on an accident site. The first vehicle 1 associates the positional information with an accident notification, and transmits the accident notification to the server 2.

The server 2 receives the accident notification from the at least one first vehicle 1, and stores the accident notification into the storage unit 13. FIG. 4 shows an example of the received accident notification. In the accident notification, the positional information is associated with an accident ID and stored.

In response to the reception of the accident notification from the first vehicle 1, the server 2 extracts each vehicle that runs within a predetermined range from the accident site. In the present embodiment, a process that is performed by the server 2 upon receiving an accident notification A001 shown in FIG. 4 from the first vehicle 1 will be described. At this time, the server 2 acquires positional information (a coordinate (P1, Q1), a coordinate (P2, Q2), and a coordinate (P3, Q3)) on the at least one second vehicle 3 (referred to as a vehicle V001, a vehicle V002, and a vehicle V003 for the sake of convenience of explanation) connected to the server 2 via the network NW, associates the positional information with the accident notification A001 as shown in FIG. 5, and stores the accident notification A001 into the storage unit 13.

The server 2 compares the positional information on the first vehicle 1 with the positional information on each of the vehicle V001, the vehicle V002, and the vehicle V003, and extracts any vehicle that runs within the predetermined range from the accident site, from the vehicle V001, the vehicle V002, and the vehicle V003. For example, the server 2 can extract a vehicle that runs toward the accident site on a road within a predetermined distance from the accident site. The predetermined distance is, for example, 10 m, but should not be limited thereto.

When it is determined that the vehicle V001 and the vehicle V002 run within the predetermined range from the accident site, the server 2 sets items "within the predetermined range?" corresponding to the vehicle V001 and the vehicle V002, as "Y", as shown in FIG. 5. When it is determined that the vehicle V003 runs outside the predetermined range from the accident site, the server 2 sets an item "within the predetermined range?" corresponding to the vehicle V003, as "N", as shown in FIG. 5.

The server 2 transmits an imaging start command including the positional information on the accident site to the at least one second vehicle 3 that runs within the predetermined range (the vehicle V001 and the vehicle V002 in this case). The server 2 can sequentially carry out the aforementioned extraction and the aforementioned transmission at intervals of a predetermined time.

Figure 6:
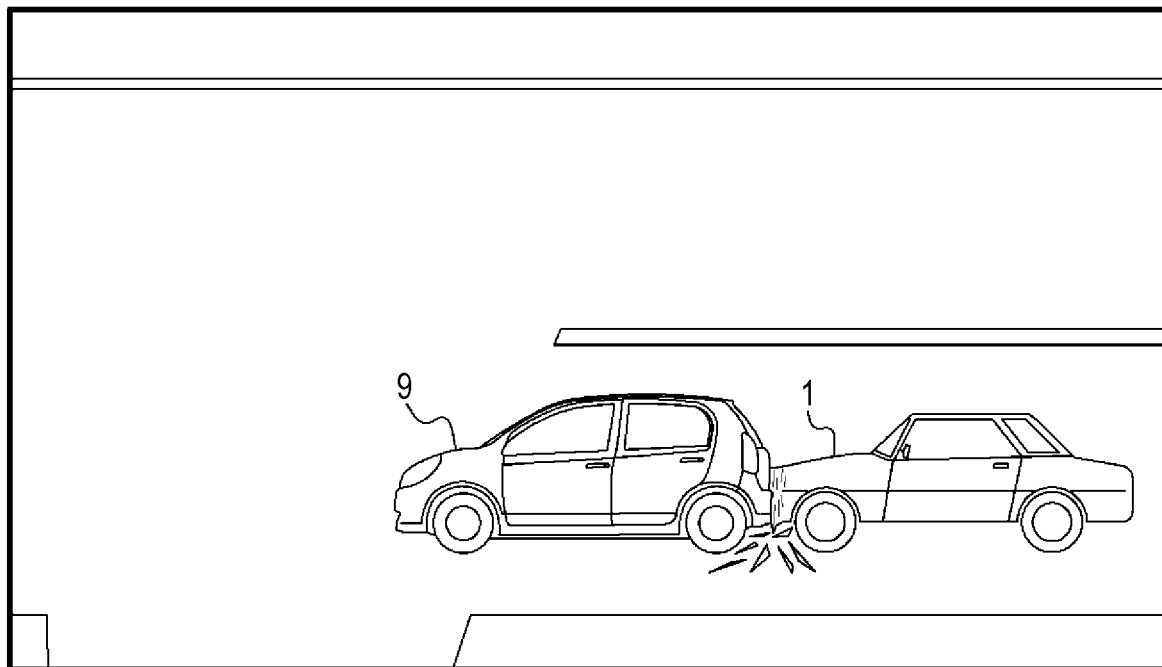
FIG. 6 is an exemplary image imaged by the second vehicle.

The second vehicle 3 that has received the imaging start command determines a position of the accident site from the positional information on the accident site included in the imaging start command. The second vehicle 3 images a periphery thereof at intervals of an arbitrary time through the use of the imaging unit 31, as long as the second vehicle 3 exists within the predetermined range from the accident site. The second vehicle 3 stores the imaged image into the storage unit 33, and transmits the imaged image to the server 2. FIG. 6 shows an example of the imaged image. In another of the embodiments, the second vehicle 3 that has received the imaging start command images the periphery thereof within a predetermined time (e.g., one minute) from the reception of the imaging start command, regardless of whether or not the second vehicle 3 exists within the predetermined range from the accident site. The second vehicle 3 may stop imaging after the lapse of the predetermined time.

The server 2 that has received the imaged image from the second vehicle 3 analyzes the imaged image through the use of an arbitrary image analysis method, for example, machine learning or the like. For example, the server 2 can determine, from the imaged image, the number of vehicles involved in a rear-end accident, the number of overturned vehicles, the number of fallen people, the number of wounded people, and the like, and determine a scale of the accident. The server 2 can calculate, from the determined scale of the accident, the number of emergency motor vehicles (e.g., ambulances or fire engines) to be sent to the accident site. The server 2 can detect how the situation of each accident site changes with time, by receiving a plurality of images from a plurality of the different second vehicles 3 at different imaging timings as to the accident site. For example, the server 2 can detect that there are flames rising from the first vehicle 1.

The server 2 associates an analysis result from the imaged image with an accident ID, and stores the accident ID into the server storage unit 22. The server 2 may notify a terminal (e.g., a terminal installed at a fire department) connected via the network NW, of the analysis result.

The server 2 can analyze the imaged image, and determine whether or not an emergency motor vehicle has arrived at the accident site. When it is determined as a result of the analysis of the imaged image that the emergency motor vehicle has arrived at the accident site, the server 2 stops the transmission of the imaging start command that has been sequentially carried out at intervals of the predetermined time.

Figure 7:
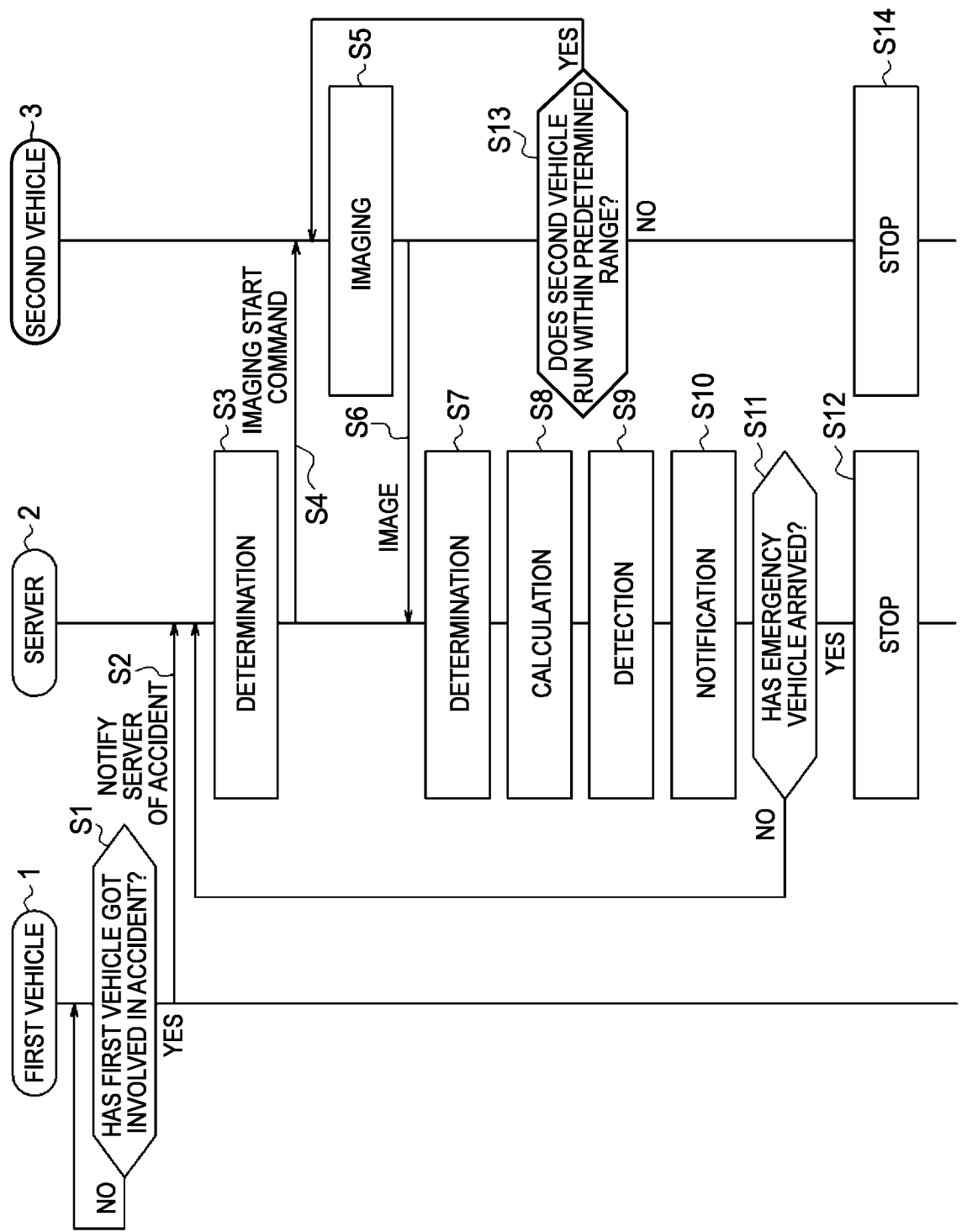
FIG. 7 is a sequence diagram of a process that is performed in the information processing system of the present embodiment.

FIG. 7 is a sequence diagram showing a process that is performed by the information processing system S at an arbitrary timing.

In step S1, the first vehicle 1 determines whether or not the first vehicle 1 has got involved in an accident. The method of determination has been described above, so the description thereof is omitted herein.

In step S2, if it is determined that the first vehicle 1 has got involved in an accident (Yes in step S1), the first vehicle 1 transmits, to the server 2, an accident notification associated with positional information on an accident site.

In step S3, upon receiving the accident notification, the server 2 determines a position of the second vehicle 3, and determines that the second vehicle 3 runs within a predetermined range from the accident site.

In step S4, the server 2 transmits an imaging start command to the second vehicle 3 that runs within the predetermined range from the accident site.

In step S5, upon receiving the imaging start command, the second vehicle 3 starts imaging.

In step S6, the second vehicle 3 transmits the imaged image to the server 2.

In step S7, the server 2 determines a scale of the accident from the imaged image.

In step S8, the server 2 calculates, from the determined scale of the accident, the number of emergency motor vehicles to be sent to the accident site.

In step S9, the server 2 receives a plurality of images imaged at different timings from a plurality of the second vehicles 3, and detects how the situation at the accident site changes with time.

In step S10, the server 2 notifies a predetermined terminal (e.g., a terminal at a fire department) of at least one piece of the information acquired in steps S7 to S9.

In step S11, the server 2 determines in the imaged images whether or not an emergency motor vehicle has arrived at the accident site.

In step S12, if it is determined that the emergency motor vehicle has arrived at the accident site (Yes in step S11), the server 2 stops transmitting the imaging start command.

In step S13, after receiving the imaging start command, the second vehicle 3 determines whether or not the own vehicle runs within a predetermined range from the accident site.

In step S14, if it is determined that the own vehicle does not run within the predetermined range from the accident site (No in step S13), the second vehicle 3 stops imaging.

As described above, according to the present embodiment, the server 2 transmits the imaging start command to the second vehicle 3 that runs within the predetermined range from the accident site, in response to the reception of the accident notification associated with the positional information on the accident site, from the first vehicle 1. The server 2 receives the imaged image from the second vehicle 3. Owing to this configuration, the server 2 can collect the image of the accident site from the second vehicle 3 that runs around the accident site. In consequence, the server 2 can grasp in an overviewing manner the situation of the accident from therearound, and hence can more accurately grasp the situation of the accident.

Besides, according to the present embodiment, the server control unit 23 receives the plurality of the imaged images from the plurality of the second vehicles 3, and detects from the imaged images how the situation at the accident site changes with time. Owing to this configuration, the server control unit 23 can grasp the latest situation at the accident site, and hence can more accurately grasp the situation at the accident site.

Besides, according to the present embodiment, the server control unit 23 sequentially transmits the imaging start command to the plurality of the second vehicles 3, and stops transmitting the imaging start command upon detecting, in the imaged images received from the plurality of the second vehicles 3, that the emergency motor vehicle has arrived at the accident site. Owing to this configuration, the server control unit 23 can avoid imposing a wasteful processing load on the second vehicles 3.

Besides, according to the present embodiment, the server control unit 23 determines the scale of the accident at the accident site, through the use of the imaged image received from the second vehicle 3. Owing to this configuration, the server control unit 23 can determine the scale of the accident without recourse to human resources, so staff and the like at the accident site can proceed with other important operations.

Besides, according to the present embodiment, the server control unit 23 calculates, from the determined scale of the accident, the number of emergency motor vehicles to be sent to the accident site. Owing to this configuration, the server control unit 23 can send a sufficient number of emergency motor vehicles, and hence can swiftly proceed with the traffic control at the accident site or the tidying of the accident site.

The disclosure is described based on the various drawings and the embodiments, but it should be noted that those skilled in the art find it easy to make various modifications and corrections based on the present disclosure. Accordingly, it should be borne in mind that these modifications and corrections fall within the scope of the disclosure. For example, the functions and the like that are included in the respective means, the respective steps or the like can be rearranged such that no logical contradiction occurs, and the plurality of the means, the steps or the like can be combined into one or divided.

For example, in the aforementioned embodiment, when it is determined that the first vehicle 1 has got involved in an accident, the first vehicle 1 associates the positional information on the first vehicle 1 with the accident notification, and transmits the accident notification to the server 2. In another of the embodiments, however, the first vehicle 1 transmits the accident notification to a predetermined one of the second vehicles 3 instead of transmitting the accident notification to the server 2. The second vehicle 3 that has received the accident notification acquires the positional information on the second vehicle 3 via the positional information acquisition unit 32. When it is determined, based on the acquired positional information, that the own vehicle runs within the predetermined range from the accident site, the second vehicle 3 starts imaging. The second vehicle 3 stores the imaged image into the storage unit 33, and transmits the imaged image to the server 2 via the communication unit 35.

It is possible to adopt a configuration in which each of an arbitrary vehicle and a server is caused to function as the first vehicle 1, the second vehicle 3, or the server 2 according to the aforementioned embodiment. In concrete terms, a program describing processing contents for realizing each function of the first vehicle 1, the second vehicle 3 or the server 2 according to the embodiment is stored into the memory of the aforementioned arbitrary vehicle or the server, and the program is read out and executed by the processor of the arbitrary vehicle or the server. Accordingly, the disclosure according to the present embodiment can also be realized as the program that can be executed by the processor.

What is claimed is:

1. A server that includes a server communication unit, a server control unit, and a server storage unit, and that is configured to be able to communicate with a first vehicle and a second vehicle via the server communication unit, wherein the server control unit transmits an imaging start command to the second vehicle, which runs within a predetermined range from an accident site, in response to reception of an accident notification associated with positional information on the accident site from the first vehicle, receives an imaged image from the second vehicle, and stores the imaged image into the server storage unit, and the server control unit receives a plurality of imaged images from a plurality of second vehicles, and detects, from the plurality of the imaged images, how a situation at the accident site changes with time.

2. The server according to claim 1, wherein the server control unit sequentially transmits the imaging start command to the plurality of the second vehicles, and stops transmitting the imaging start command upon detecting, in the imaged images received from the plurality of the second vehicles, that an emergency motor vehicle has arrived at the accident site.

3. The server according to claim 1, wherein the server control unit determines a scale of an accident at the accident site, through use of the imaged image received from the second vehicle or the imaged images received from the second vehicles.

4. The server according to claim 3, wherein the server control unit calculates, from the determined scale of the accident, a number of emergency motor vehicles to be sent to the accident site.

5. A server control method for a server that includes a server communication unit, a server control unit, and a server storage unit, wherein the server is connected in a communicable manner to a first vehicle and a second vehicle via the server communication unit, the method comprising:

a step of transmitting an imaging start command to the second vehicle, which runs within a predetermined range from an accident site, in response to reception of an accident notification associated with positional information on the accident site from the first vehicle; and a step of receiving an imaged image from the second vehicle and storing the imaged image into the server storage unit, and a step of receiving a plurality of imaged images from a plurality of second vehicles, and detecting, from the plurality of the imaged images, how a situation at the accident site changes with time.

\* \* \* \* \*